(12) United States Patent  (10) Patent No.: US 7,826,611 B2
Farahat et al.  (45) Date of Patent: Nov. 2, 2010

(54) SYSTEM AND METHOD FOR EXCHANGING A TRANSFORMED MESSAGE WITH ENHANCED PRIVACY

(75) Inventors: Ayman Omar Farahat, San Francisco, CA (US); Philippe Jean-Paul Golle, San Francisco, CA (US); Aleksandra Korolova, Stanford, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1059 days.

(21) Appl. No.: 11/252,007

(22) Filed: Oct. 17, 2005

(65) Prior Publication Data

US 2007/0086587 A1    Apr. 19, 2007

(51) Int. Cl.
    *H04K 1/00*    (2006.01)
(52) U.S. Cl. .......................... 380/28; 380/259; 380/260; 380/261; 380/262; 380/263; 713/160; 713/161; 713/162; 713/163
(58) Field of Classification Search ................. 709/9; 705/54, 57; 380/28, 80, 259–263; 713/160–163
    See application file for complete search history.

(56) References Cited

U.S. PATENT DOCUMENTS 6,055,528 A * 4/2000 Evans ............................ 707/3
6,314,409 B2 * 11/2001 Schneck et al. ............... 705/54
7,171,349 B1 * 1/2007 Wakefield et al. .............. 704/9
2005/0237316 A1 * 10/2005 Huang et al. ................. 345/204

OTHER PUBLICATIONS

M. Chew et al., "Baffle Text: a Human Interactive Proof," Proc. 10th IS&T/SPIE Doc. Recog. & Retr. Conf., Santa Clara, CA (Jan. 23-24, 2003).

* cited by examiner

*Primary Examiner*—Taghi T Arani
*Assistant Examiner*—Josnel Jeudy
(74) *Attorney, Agent, or Firm*—Patrick J.S. Inouye; Krista A. Wittman (57) ABSTRACT

A system and method for exchanging a transformed message with enhanced privacy is presented. A set of input messages is defined. A set of output messages is defined. A message is selected from the input messages set. One or more words in the selected message are efficiently transformed directly into a transformed message different from the selected message, wherein the transformed message belongs to the set of output messages, at least one component of the selected message is recoverable from the transformed message, and the cost of determining whether the transformed message belongs to the input messages set or the output messages set exceeds a defined threshold.

20 Claims, 7 Drawing Sheets

SYSTEM AND METHOD FOR EXCHANGING A TRANSFORMED MESSAGE WITH ENHANCED PRIVACY

FIELD

This application relates in general to email privacy and, in particular, to a system and method for exchanging a transformed message with enhanced privacy.

BACKGROUND

Email, text messaging, and other forms of digital messages are part of a growing trend in electronically-exchangeable and -storable written communication. Message privacy can often be a concern, but users frequently rely on the relative anonymity provided by message traffic volume to decrease the likelihood of compromise. At best, this reliance provides a false sense of security.

Message content is decided by the author; however, the handling of and access to a message falls outside the control of the sender once the message has been transmitted. A message sender is wholly at the mercy, or whim, of intermediaries, which effect message exchange and there are no guarantees or assurances that privacy will be afforded. Moreover, intermediaries lack control over the actions of third parties acting from outside of authorized communication channel. As a result, privacy over message content cannot be ensured completely unless the sender takes specific precautions to protect their privacy.

Moreover, privacy is particularly important to protect messages while in transit, which are susceptible to attack by parties acting from within and from outside of the communication channel. Targeted and profiling attacks are but two examples. In a targeted attack, a specific sender's messages are singled-out as targets to be compromised for surreptitiously acquiring information, generally for a covert purpose. In a profiling attack, the messages of a group or population of users are targeted, with no particular significance attached to any individual sender. A profiling attack aims to classify a population of users into categories based on semantic content extracted from messages exchanged. The categories can be used for delivering contextual advertisements or other purposes.

Strong encryption, including symmetric and public key encryption, provides the highest form of privacy attack protection, but at a cost. Symmetric encryption requires that both the sender and recipient of a message have a copy of the same encryption key, which requires advance planning and secure key exchange. Similarly, public key encryption requires a support infrastructure to register and issue a public encryption key to requesting parties. Thus, privacy is available, but at the significant expense of key exchange and management mechanisms. Furthermore, the use of symmetric or public-key encryption is easily detected and may draw unwanted attention to encrypted communications.

Steganography provides an undetectable form of privacy protection. Steganography hides or embeds information within a block of host data where host data alterations are imperceptible, such as by encoding audio data in frequency ranges that are humanly inaudible. Lexical steganography hides blocks of text at the lexical or word level through data hiding. In one form of lexical steganography, synonyms are substituted for words having equivalent meaning. The individual words signify bit values, which have relevance when decoded and combined. However, lexical steganography produces ciphertext that is significantly larger than the source message and thus incurs high communication costs. Over time, this high communication cost may also expose the fact that steganography is being used.

Therefore, there is a need for providing privacy to messages in a way that is both efficient and undetectable.

SUMMARY

A system and method provide stealth encryption, which directly transforms a plaintext message, such as email, into ciphertext using information that is known to both the sender and recipient of the message. The plaintext message is transformed directly without using host or other data to form the ciphertext, which could result in generating an encrypted message having a lexical structure significantly different from the original plaintext message. An encryption key k is defined according to the output of a deterministic function applied, such as by applying a slow one-way deterministic function p to the email header H. The cost of evaluating the deterministic function exceeds a certain threshold to frustrate and disincentivize privacy attacks, such as profiling attacks. The encryption key k identifies a secret family of permutations within a lexicon that is used to modify the semantic content of the message, while preserving grammatical structure and other non-semantic linguistic features. The message body M is encrypted into ciphertext with an encryption function $E_k$ and the message is sent by concatenating the header H with the encrypted message body $E_k(M)$. Decryption is performed in a reverse ordering of operations. In a further embodiment, the encryption key k is represented as image text that is human- but not machine-readable and the message is recovered through semi-automatic reconstruction using the ciphertext and image text. Other forms of stealth encryption are possible.

One embodiment provides a system and method for exchanging a transformed message with enhanced privacy. A set of input messages is defined. A set of output messages is defined. A message is selected from the input messages set. One or more words in the selected message are efficiently transformed directly into a transformed message different from the selected message, wherein the transformed message belongs to the set of output messages, at least one component of the selected message is recoverable from the transformed message, and the cost of determining whether the transformed message belongs to the input messages set or the output messages set exceeds a defined threshold.

A further embodiment provides a system and method for sending a transformed message with enhanced privacy. A set of input messages is defined. A set of output messages is defined. One or more words in an input message are efficiently transformed directly into a transformed message different from the input message and the transformed message is sent. At least one word of the input message is substituted with a word selected from either the input messages set or the output messages set, wherein the cost of identifying the substitution exceeds a defined threshold.

A still further embodiment provides a system and method for receiving a transformed message with enhanced privacy. A set of input messages is defined. A set of output messages is defined. A transformed message is received and one or more words in the transformed message are efficiently transformed directly into an input message different from the transformed message. At least one word of the transformed message is recovered from either the input messages set or the output messages set, wherein the cost of recovering the word exceeds a defined threshold.

A still further embodiment provides a system and method for exchanging a transformed message between a sender and a recipient with enhanced privacy. A set of input messages is defined. A set of output messages is defined. A message is selected from the input messages set. one or more words in the selected message are efficiently transformed directly into a transformed message different from the selected message by altering the selected message semantics but preserving structure. An encryption key k is defined according to the output of a deterministic function applied to the one component of the selected message that is recoverable from the transformed message, wherein the cost of evaluating the deterministic function exceeds a certain threshold. A transformation function is defined according to an output of a deterministic function parameterized by a choice of the encryption key k, wherein the transformed message belongs to the set of output messages, at least one component of the selected message is recoverable from the transformed message, and the cost of determining whether the transformed message belongs to the input messages set or the output messages set exceeds a defined threshold.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Message Exchange Environment

Figure 1:
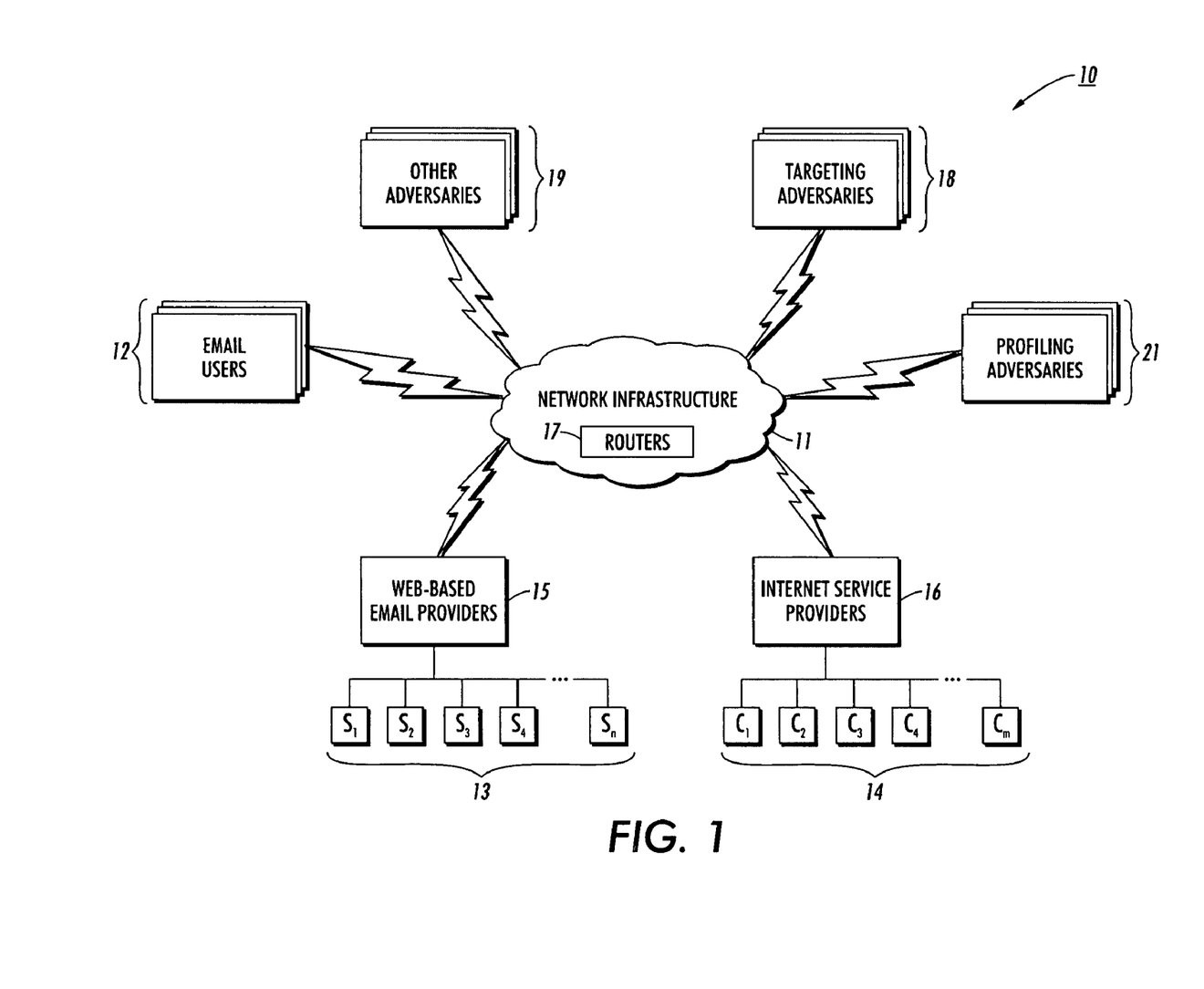
FIG. 1 is a block diagram showing a message exchange environment.

Messages include email, text messaging, and other forms of digitally-exchangeable and -storable communications that originate with a sender and are electronically sent or broadcast to one or more intended recipients. Email is a particular form of message that generally conforms to a standardized and widely-adopted exchange protocol providing conventions for formatting and transport. In the discussion following, email messages are specifically described for the sake of clarity and convenience, but the discussion applies equally to all other message types. FIG. 1 is a block diagram showing a message exchange environment 10. The environment 10 facilitates the exchange of email between email senders and recipients, collectively referred to as email users 12, over a communications network infrastructure 11, such as the Internet or a wireless communications network. The email users 12 are interconnected to the network infrastructure 11 either directly or indirectly through intermediary servers, gateways, and other network-access pathways. Email senders and recipients can also include subscribers 13 to Web-based email providers 15 and clients 14 of Internet Service Providers (ISPs) 16, as well as other domain-level email providers. No distinction is drawn between Web-based email subscribers 13, ISP-based email clients 14, and email users 12 generally and, accordingly, all email senders and recipients will be generally referenced as email users.

Targeting adversaries 18 pose one threat to email users 12 through attempts to selectively compromise the email of one or more specific email user 12, generally for covert purposes and without authorization. Other adversaries 19 to individual email users are possible. Strong encryption provides a highest form of privacy protection against targeting adversaries 18, as further described below with reference to FIG. 2.

Profiling adversaries 21 pose a more realistic threat to email users 12, which target a group or population of users' messages with no particular significance attached to an individual sender or recipient. Profiling adversaries 21 can include presumptively trustworthy intermediaries, such as Web-based email providers 15, ISPs 16, and backbone inter-network routers 17, as well as third parties to the communication channel, which can include, potentially, intelligence agencies, governments, and other interests. Profiling adversaries 21 attempt to classify a population of users into categories using semantic content extracted from messages exchanged to facilitate a broadly-defined purpose, such as delivering contextual advertisements in conjunction with emails. Other forms of profiling adversaries are possible. Strong encryption will block the efforts of profiling adversaries 21, but such precautions are overkill for the average email user due to the cumbersome mechanisms required and high costs for assured privacy. Alternatively, email users can protect their email through stealth encryption, which provides enhanced privacy to email by altering message semantics while preserving the remaining message structure and appearance, including syntax and formatting, as further described below, beginning with reference to FIG. 4.

Preferably, the email users 12, Web-based email subscribers 13, and ISP email clients 14 are general-purpose computing workstations, such as a personal desktop or notebook computer. In addition, these systems are programmable computing devices that execute software programs and include components conventionally found in a computing device, such as, for example, a central processing unit, memory, network interface, persistent storage, and various components for interconnecting these components.

Prior Art Message Exchange Using Cryptographic Key

Figure 2:
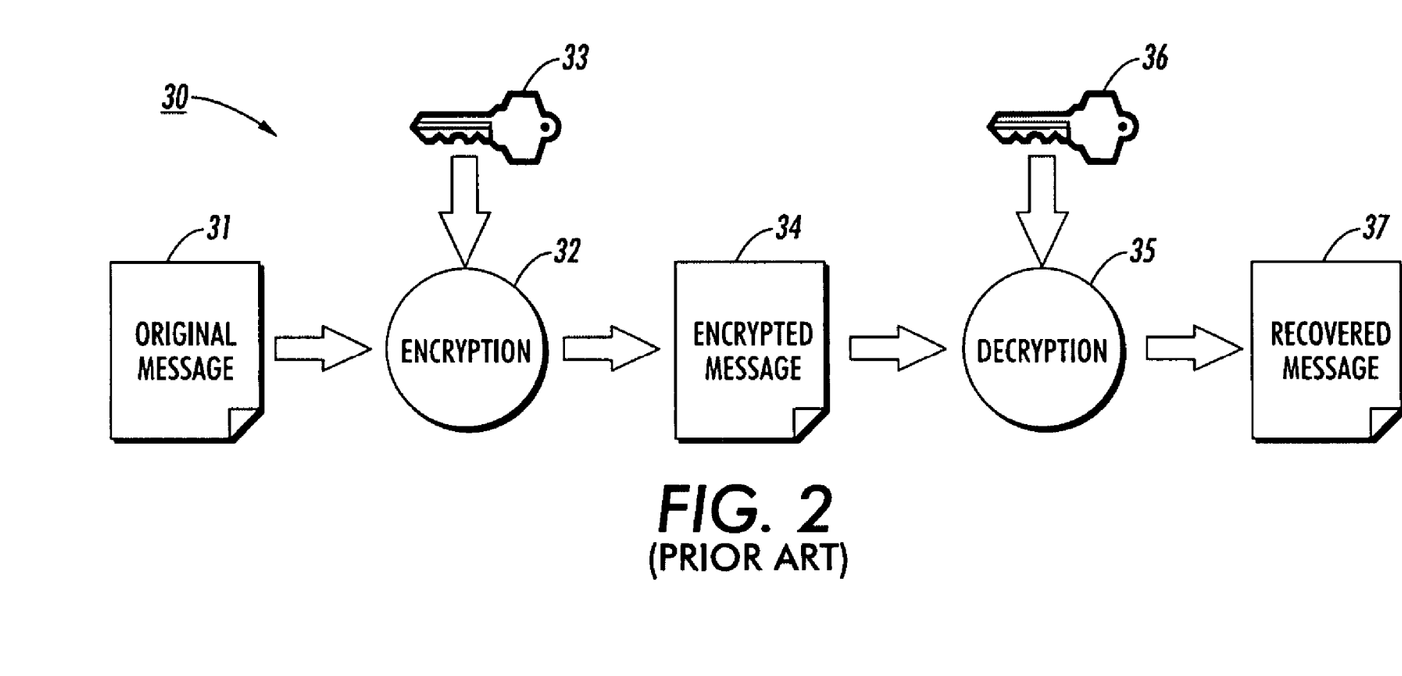
FIG. 2 is a data flow diagram showing prior art message exchange using cryptographic keys.

Strong encryption generally refers to protecting a message against compromise through cryptographic means. FIG. 2 is a data flow diagram showing prior art message exchange 30 using cryptographic keys 33, 36. By way of example, strong encryption can be provided through symmetric or public key encryption, although other forms of encryption exist.

Symmetric key encryption uses a single key to encrypt or decrypt information. An original message 31 is encrypted (operation 32) by applying a symmetric key 33 to generate an encrypted message 34. The encrypted message 34 is decrypted (operation 35) by applying the same symmetric key 36 to generate a recovered message 37. The senders and recipients of the message must agree beforehand on a shared symmetric key that is securely exchanged prior to use.

Public key encryption uses two keys, a public key and a private key, to encrypt or decrypt information. Generally, the public key is available through a key directory or server for use by any message sender to encrypt a message. The private key belongs to the originator of the public key and is used to decrypt messages encrypted using the public key. An original message 31 is encrypted (operation 32) by applying a public key 33 to generate an encrypted message 34. The encrypted message 34 is decrypted (operation 35) by applying a private key 36 to generate a recovered message 37. Access to public keys must be managed through the key server or directory prior to use.

Although providing a highest form of privacy protection, symmetric and public key encryption are costly due to key exchange and management needs. Moreover, cryptographic key-based privacy protection requires advanced planning and coordination between message senders and recipients and is possibly overkill in overprotecting every aspect of a message, not all of which represents semantic content of potential interest to a profiling adversary. Finally, the use of symmetric or public-key encryption is easily detected and may draw unwanted attention to encrypted communication.

Prior Art Message Exchange Using Steganography

Figure 3:
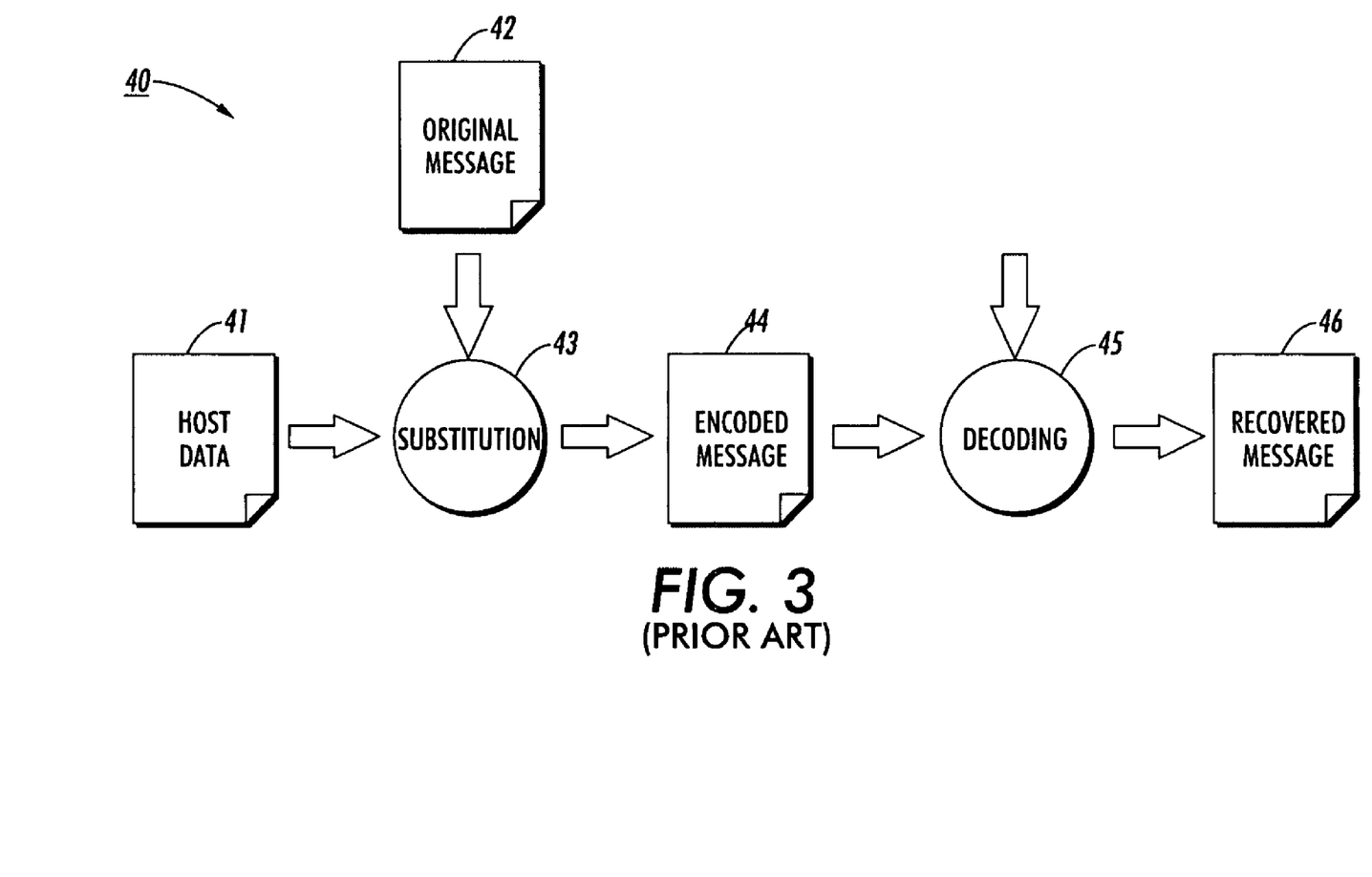
FIG. 3 is a data flow diagram showing prior art message exchange using steganography.

Steganography generally refers to hiding or embedding information within a block of host data. FIG. 3 is a data flow diagram showing prior art message exchange 40 using steganography. By way of example, steganography can be provided at the lexical or word level, although other forms of steganography exist.

Steganography uses host data, such as plain text, for hiding or embedding information. In lexical steganography, individual words appearing within a block of host data 41 are substituted (operation 43) using synonyms having equivalent meanings. The substitution encodes an original message 42 one bit at-a-time per word substituted to generate an encoded message 44. Alternatively, multiple bits could be encoded by using a richer set of synonyms. The encoded message 44 is decoded (operation 45) to identify the bit values represented by the synonyms that have been substituted into the host data 41 and to generate a recovered message 46.

Although providing an undetectable form of privacy protection, steganography produces cipher text that is significantly larger than the original message and incurs high communication costs.

Figure 4:
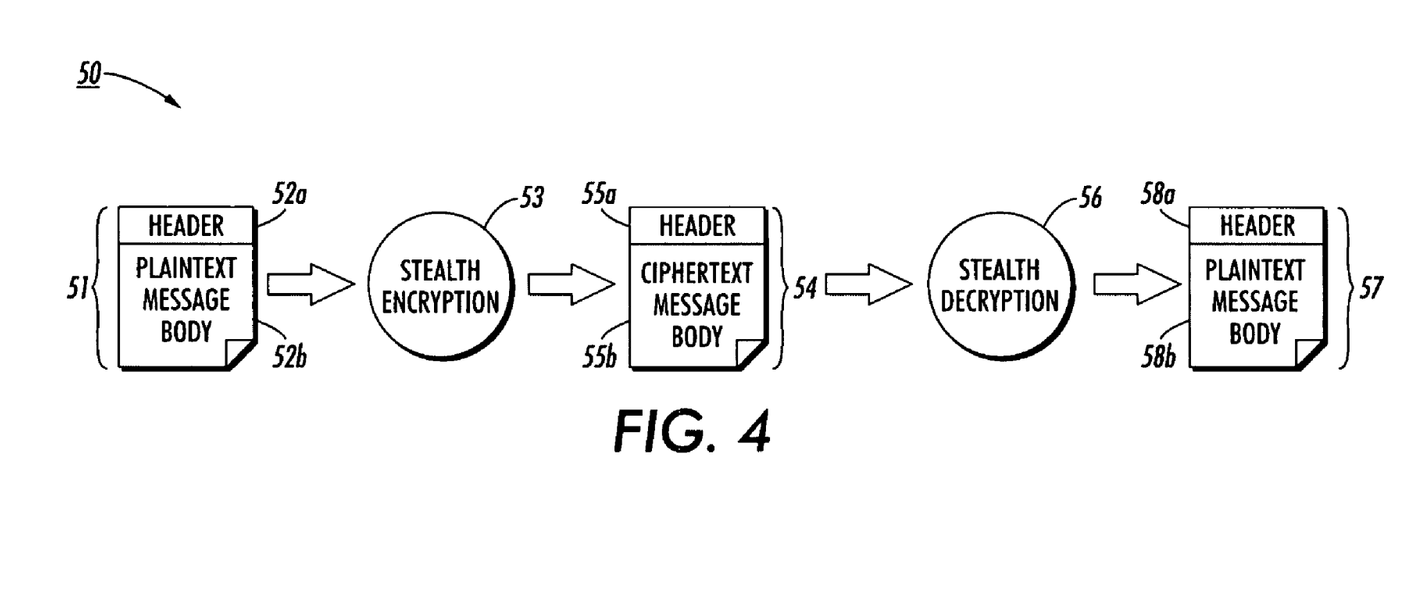
FIG. 4 is a data flow diagram showing message exchange using stealth encryption, in accordance with one embodiment.

Message Exchange Using Stealth Encryption Stealth encryption provides privacy protection that incurs a lower cost than regular symmetric or public-key encryption and cannot easily be detected by a machine. These benefits are achieved by altering the semantics while preserving the structure of protected messages. FIG. 4 is a data flow diagram showing message exchange 50 using stealth encryption, in accordance with one embodiment. Generally, stealth encryption disguises the semantic content of a plaintext message by substituting words in the message according to a family of permutations defined on a lexicon. The family of permutations is derived from a key that can itself be derived from the message and requires no separate coordination, exchange, or management mechanisms. Each plaintext message is transformed directly without using host or other data to form ciphertext, which could result in generating an encrypted message having an appearance or lexical structure significantly different from the original plaintext message, such as occurs with strong encryption and steganography.

In one embodiment, an encryption key k is defined according to the output of a deterministic function, such as by applying a slow one-way function ρ to the header 52a of a plaintext message 51, and the plaintext message body 52b is encrypted (operation 43) according to the output of a deterministic function parameterized by the choice of encryption key k. This form of stealth encryption 53 hides the semantics of the plaintext message body 52b while preserving the message structure and appearance. The cost of evaluating the deterministic function exceeds a certain threshold to frustrate and disincentivize privacy attacks, such as profiling attacks. The resulting ciphertext message body 55b is concatenated to a copy of the header 55a. The resulting message 54 can be decrypted (operation 55) by recovering the key k according to the output of a deterministic function, such as by applying the slow one-way function ρ to the header 58a and decrypting the ciphertext according to the output of a deterministic function parameterized by the key k to recover the plaintext message body 58b. A machine-based adversary cannot easily distinguish the encrypted message 54 from the plaintext message 51. While an automated adversary could intercept and decrypt the message 54 in principle, the adversary would nevertheless be unable to automatically distinguish encrypted and unencrypted messages in a reliable and efficient manner, as the semantic content is obscured. As a result, the adversary would misinterpret an encrypted message unless the encrypted message were first decrypted and would misinterpret a plaintext message if the plaintext message were first decrypted. Thus, stealth encryption enables privacy enhanced message exchange at low resource cost.

In a further embodiment (not shown), the key k is included with the plaintext message body using image text that is human-readable, yet not readily machine-readable, such as described in M. Chew & H. S. Baird, "Baffle Text: a Human Interactive Proof," Proc. 10$^{th}$ IS&T/SPIE Doc. Recog. & Retr. Conf., Santa Clara, Calif. (Jan. 23-24, 2003), the disclosure of which is incorporated by reference. Ciphertext is similarly selected according to the output of a deterministic function ρ parameterized by the choice of encryption key k and can be recovered through reconstruction by interpreting the image text and ciphertext. Other forms of stealth encryption are possible.

Figure 5:
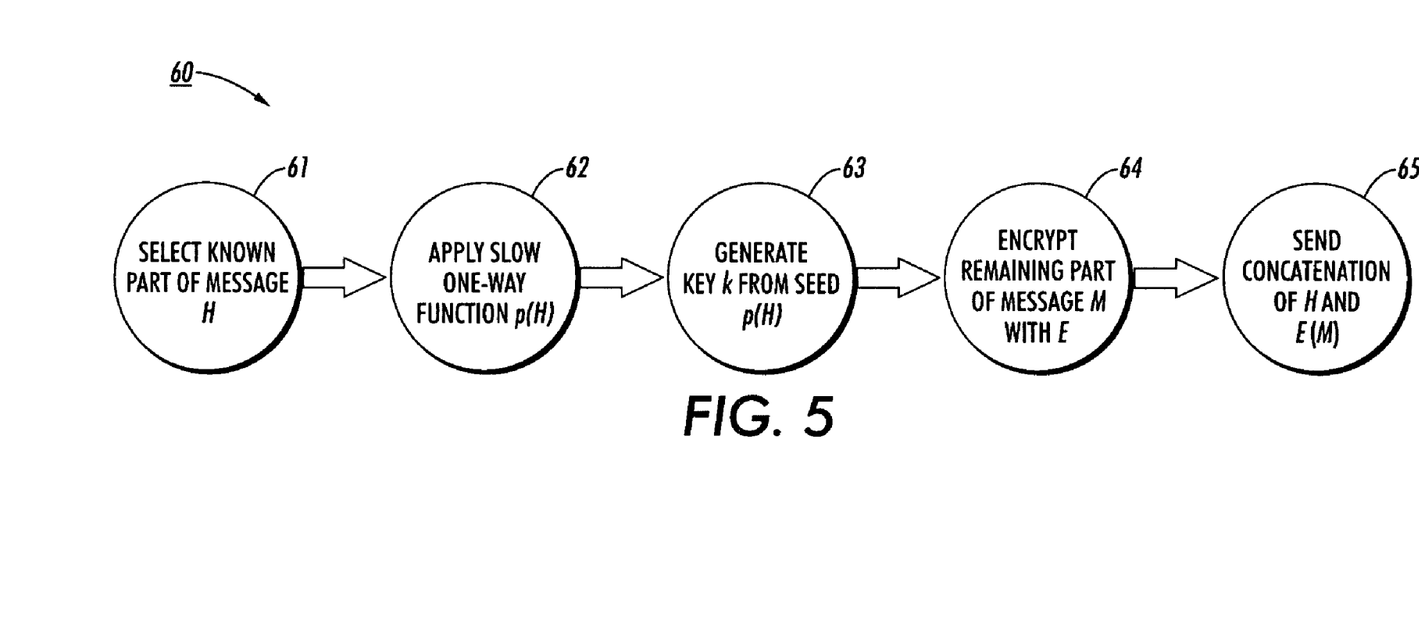
FIG. 5 is a process flow diagram showing a method for stealth message encryption, in accordance with one embodiment.

In one embodiment, the encryption key k is obtained using plaintext that is commonly known to both the sender and recipient. FIG. 5 is a process flow diagram showing a method for stealth message encryption 60, in accordance with one embodiment. In simplest form, each plaintext word in the message is replaced with a word of ciphertext drawn from a lexicon, where the mapping $E_k$ between plaintext and ciphertext words is determined by the selection of the secret encryption key k. The encryption function $E_k$ is designed to obscure the semantics of the plaintext, while preserving the appearance of standard English. No semantic information about the message content is revealed to a machine observer, yet each privacy-enhanced message is statistically indistinguishable from normal plaintext messages. Although described with reference to an English-language implementation, other languages could also be implemented.

From a high-level perspective and using email as an example, the part of the message known to both the sender and recipient, generally, the header H, is selected. Other parts of the message could be known to both the sender and recipient, either in addition to or in lieu of the message header H. A deterministic function, such as a slow one-way function ρ, is applied to the header H to compute a seed ρ(H) (operation 62). The cost of evaluating the deterministic function exceeds a certain threshold to frustrate and disincentivize privacy attacks, such as profiling attacks. The slow one-way function ρ is preferably a publicly-known function that is moderately costly to evaluate requiring, for instance, on the order of several seconds of computation, and being hard to invert. An encryption key k is generated from the seed ρ(H) (operation 63) and the body of the message M is encrypted with the encryption function $E_k$ (operation 64). The header H and the encrypted message body $E_k(M)$ are concatenated and sent to the recipient (operation 65).

Figure 6:
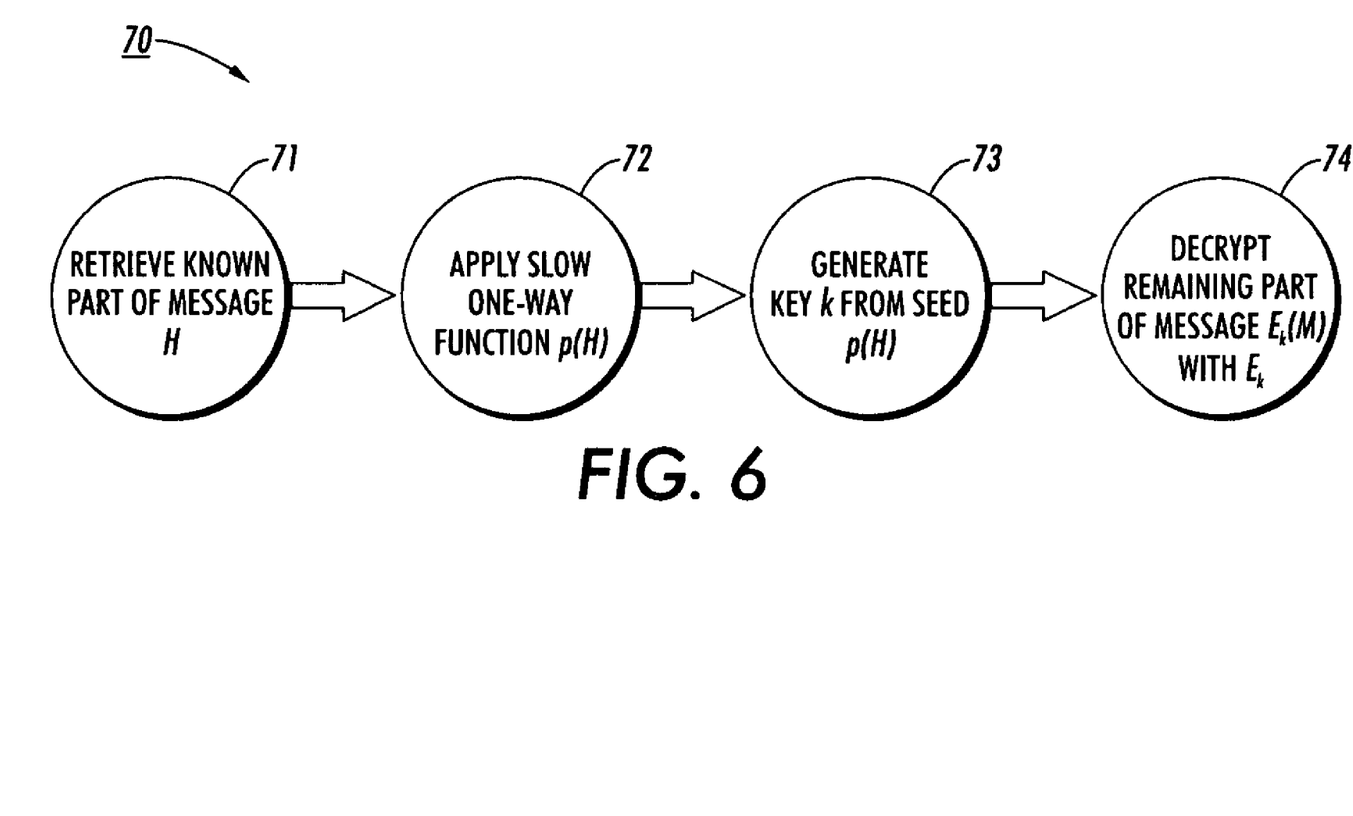
FIG. 6 is a process flow diagram showing a method for stealth message decryption, in accordance with one embodiment.

Decryption of a privacy-enhanced message is identical to the encryption, but performed in a reverse order. FIG. 6 is a process flow diagram showing a method for stealth message decryption 70, in accordance with one embodiment. The known part of the message, generally the message header H, is first retrieved (operation 71) and the deterministic function, such as a slow one-way function ρ(H), is applied (operation 72). The encryption key k is generated from the seed ρ(H) (operation 73) and the key k is used to decrypt the remaining part of the message body $E_k(M)$ with the encryption function $E_k$ (operation 74). Stealth encryption will now be discussed in detail.

Conventionally, Parts-of-Speech (POS) tagging and Zipf's law are two of the simplest and most efficient statistical tests used in profiling attacks to determine whether a document contains standard English text. In stealth encryption, the encryption function $E_k$ obscures the semantics of the plaintext, while preserving the appearance of standard English to ensure that profiling adversaries are provided with no significant further semantic information than would otherwise be available without having seen any messages.

In POS tagging, the words of a language are grouped into categories according to syntactic behavior. English language syntax is typically divided into eight categories: nouns, verbs, adjectives, pronouns, determiners, adverbs, prepositions, and conjunctions. A POS tagger accepts an input message and outputs a tagged message that assigns a POS category to each word. The POS tagger then computes the sequence of POS tags and estimates the probability that the sequence is standard English. Accordingly, to preserve the syntax of English text, the stealth encryption function $E_k$ maps verbs to verbs, nouns to nouns, prepositions to prepositions, and so forth, for all parts of speech to ensure that ciphertext has the same sequence of POS tags as plaintext.

According to Zipf's law, the frequency f of a word is related to the position or rank r of the word in a list of all words sorted by frequency. Zipf's law states:

$$f \infty \frac{1}{r}$$

The word count in a document is compared to expected counts in standard English using a statistical test, such as the log likelihood ratio. If the distribution of terms in the document is significantly different from the distribution of terms in a standard corpus, the document is unlikely to be English.

To preserve a Zipfian distribution of terms, stealth encryption maps a word w to a new word w', such that |Rank(w)−Rank(w')|≤α, where α is a small integer. The encryption function $E_k$ maps a plaintext word to a ciphertext word that belongs to the same POS category and that has approximately the same frequency in standard English within the same POS category, leaving words that are not in the English language unchanged. Stated in formal terms, stealth encryption operates like a low-inversion permutation on sets of words. More precisely, let π be a permutation on n elements and define:

$$\tilde{\pi}(i) = |\{j | j < i \text{ and } \pi(j) > \pi(i)\}|$$

where $\tilde{\pi}(i)$ is the number of integers j that are smaller than i but are mapped by the permutation π to an integer greater than π(i). Thus, π is an α-low inversion permutation if there exists a constant α, such that $\tilde{\pi}(i) < \alpha$ for all i.

Stated in formal terms, let a language $\mathcal{L}$ be a finite subset of $\{0,1\}^*$. For example, $\mathcal{L}$ can consist of all valid English words. Other languages can be represented similarly. Let $\mathcal{T} = \{T_0, T_1, \ldots, T_k\}$ be a set of κ+1 distinct tags, and let τ be a deterministic tagging function with domain $\{0,1\}^*$ and range $\mathcal{T}$, such that $\tau^{-1}(T_0) = \{0,1\}^* - \mathcal{L}$. (The tag $T_0$ is reserved for strings that are not in the language $\mathcal{L}$) For i=1, ..., κ, let $\mathcal{L}_i = \tau^{-1}(T_i)$ and let $N_i = |\mathcal{L}_i|$. For i=1, ..., k, let $\theta_i$ be the bijection that maps a string $w \in \mathcal{L}_i$ to the frequency rank $\theta_i(w) \in \{1, \ldots, N_i\}$ of w within the set $\mathcal{L}_i$. The inverse bijection $\theta_i^{-1}$ maps a frequency rank to the word that occupies that rank within $\mathcal{L}_i$.

For key generation, let α be a fixed constant. A key for stealth encryption is a family $K = \{\pi_1, \ldots, \pi_k\}$ of k secret permutations, where $\pi_i$ is an α-low permutation on $N_i$ elements for i=1, ..., k.

For encryption, let M be plaintext. To encrypt M with a key $K = \{\pi_1, \ldots, \pi_k\}$, a tokenizer is run to divide M into n strings $M = w_1 \| \ldots \| w_n$, where $w_i \in \{0,1\}^*$ for i=1, ..., n and a tag $\tau(w_i)$ associated with each string $w_i$ is computed. Let $t_i$ denote the index of the tag $\tau(w_i)$, where $t_i \in \{0, \ldots, k\}$. For i=1, ..., n, an encrypted word form $E_K(w_i)$ is computed, where:

$E_K(w_i) = \theta_{t_i}^{-1}(\pi_{t_i}(\theta_{t_i}(w_i)))$ if $t_i > 0$, and $E_K(w_i) = w_i$ otherwise.

The ciphertext $E_K(M)$ is a concatenation of the individual string encryptions $E_K(M) = E_K(w_1) \| \ldots \| E_K(w_n)$. The decryption operation is the reverse of the encryption operation, where $w_i = \theta_{t_i}^{-1}(\pi_{t_i}^{-1}(\theta_{t_i}(E_K(w_i))))$.

In a further embodiment, grammatical dependencies between syntactically linked words are preserved to produce grammatically correct ciphertext. Grammatical dependencies include, for instance, subject-verb agreement, tense consistency, proper article usage, proper ancillary usage, and prepositions. Other grammatical dependencies are possible and languages other than English can have different dependencies. Generally, pronouns, determiners, adverbs, prepositions, and conjunctions contain little semantic and are not encrypted. Conversely, nouns, verbs, and adjectives are encrypted in a manner that preserves the grammatical form of the original.

In a still further embodiment, syntactic tags are associated with the root form of words, instead of with the actual words. Formally stated, given a word $w \in \mathcal{L}$, a root form $w_r$ and the sequence of morphological processes μ used to obtain w from $w_r$ are identified. Let t indicate the tag $T_t$ obtained for $w_r$. The corresponding new root form $w_r'$ is determined, as before, where:

$w_r' = \theta_t^{-1}(\pi_t(\theta_t(w_r)))$ if $t > 0$, and $w_r' = w_r$ otherwise.

An encryption $E_K(w)$ or w by applying the sequence of morphological processes μ to $w_r'$. Ambiguity is resolved arbitrarily for those root forms that can belong to multiple plausible syntactic categories.

In a still further embodiment, syntactic tags are associated with the morphological analysis of each word. For words that can have multiple plausible morphological analyses, a valid syntactic tag is assigned arbitrarily. For best results, the morphological analysis used to determine the syntactic tag includes both inflection and derivational processes. Other forms of syntactic POS tagging are possible.

Stealth Encryption System

Figure 7:
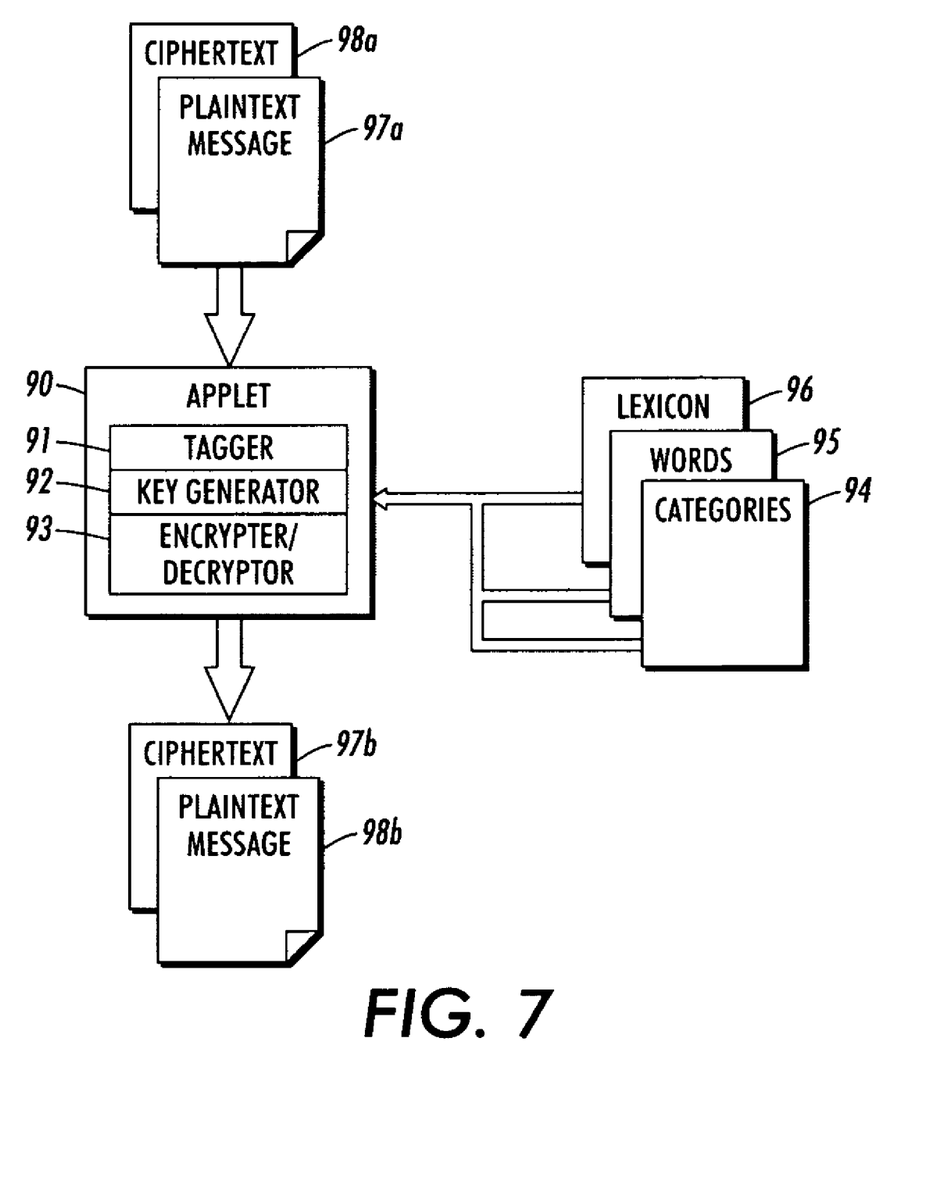
FIG. 7 is a functional block diagram showing a system for stealth encryption, in accordance with one embodiment.

Stealth encryption can be provided to email users, as well as to users of other forms of message exchange, by introducing a lightweight client, such as an applet, to operate in conjunction with email authoring and viewing applications. FIG. 7 is a functional block diagram showing a system for stealth encryption 90, in accordance with one embodiment. In one embodiment, the applet 90 can be implemented as part of or separately from an email application. The applet 90 executes a sequence of programmed process steps, such as described above with reference to FIGS. 4-6, implemented, for instance, on a programmed digital computer system.

The applet 90 includes a tagger 91, key generator 92, and encrypter/decryptor 93. For encryption, the tagger 91 parses and assigns a syntactic POS tag to words 95 contained in a plaintext message 97a. The syntactic tags assign each word 95 to one of the syntactic categories 94. Words 95 that can fall into multiple plausible syntactic categories 94 are assigned arbitrarily. The key generator 92 applies a deterministic function, such as a slow one-way function $\rho$, to a part of the plaintext message 97a known to both the sender and recipient, generally the header H, and generates a key k that is used to select a secret family of permutations on subsets of a lexicon 96. The cost of evaluating the deterministic function exceeds a certain threshold to frustrate and disincentivize privacy attacks, such as profiling attacks. Finally, the encrypter/decryptor 93 encrypts the body of the plaintext message 97a with the encryption function $E_k$ to generate resultant ciphertext 97b.

For decryption, the key generator 92 recovers the key k by computing the seed $\rho$ using a commonly known part of the message, generally the message header H. The encrypter/decryptor 93 uses the key k to decrypt the encrypted body $E_k(M)$ of the received ciphertext 97b to generate resultant plaintext message 98b. Other applet operations are possible.

While the invention has been particularly shown and described as referenced to the embodiments thereof, those skilled in the art will understand that the foregoing and other changes in form and detail may be made therein without departing from the spirit and scope.

What is claimed is:

1. A system for exchanging a transformed message with enhanced privacy, comprising:
   a data store to store a plurality of electronic digital messages comprising:
   a defined set of input messages;
   and a defined set of output messages;
   a memory to store a lexicon comprised of a defined family of secret permutations, which are derived from an encryption key k; and
   a processor to execute modules comprising:
   a selection module to select a message from the input messages set; a message module to efficiently transform with the secret permutations of the lexicon one or more words in the selected message directly into a transformed message different from the selected message, wherein the transformed message belongs to the set of output messages, at least one component of the selected message is recoverable from the transformed message and a cost of determining whether the transformed message belongs to the input messages set or the output messages set exceeds a defined computational cost threshold;
   a key generator module to define the encryption key k according to the output of a deterministic function applied to the one component of the selected message that is recoverable from the transformed message, wherein the cost of evaluating the deterministic function exceeds a certain computational cost threshold;
   a transformation function defined according to an output of a deterministic function parameterized by a choice of the encryption key k; and
   a tagger to identify a morphological process for each word and to tag a resulting root form of the word, wherein a substitute root form is selected by applying the transformation function and the morphological process is applied to the substitute root form.

2. A system according to claim 1, wherein semantics are altered but structure of the selected message is preserved.

3. A system according to claim 1, wherein the tagger assigns each word to at least one category and the transformation function preserves the categories of the words.

4. A system according to claim 3, wherein the categories consist of grammatical categories selected from the group comprising nouns, verbs, and adjectives.

5. A system according to claim 3, wherein one such category is arbitrarily selected if the word is assigned into a plurality of categories.

6. A system according to claim 1, wherein the one component of the selected message that is recoverable from the transformed message is provided using image text that is human-readable, yet not readily machine-readable.

7. A method for exchanging a transformed message with enhanced privacy, wherein all the steps are performed on a suitably programmed computer comprising:
   defined a set of input messages;
   defined a set of output messages;
   defining a lexicon comprised of a family of secret permutations, which are derived from an encryption key k;
   selecting a message from the input messages set;
   efficiently transforming with the secret permutations of the lexicon one or more words in the selected message directly into a transformed message different from the selected message, wherein the transformed message belongs to the set of output messages, at least one component of the selected message is recoverable from the transformed message, and the cost of determining whether the transformed message belongs to the input messages set or the output messages set exceeds a defined computational cost threshold;
   defining the encryption key k according to the output of a deterministic function applied to the one component of the selected message that is recoverable from the transformed message, wherein the cost of evaluating the deterministic function exceeds a certain computational cost threshold;
   defining a transformation function according to an output of a deterministic function parameterized by a choice of the encryption key k; and
   identifying a morphological process for each word and tagging a resulting root form of the word;
   and selecting a substitute root form by applying the transformation function and applying the morphological process to the substitute root form.

8. A method according to claim 7, further comprising:
   altering semantics but preserving structure of the selected message.

9. A method according to claim 7, further comprising:
assigning each word to at least one category, wherein the transformation function preserves the categories of the words.

10. A method according to claim 9, wherein the categories consist of grammatical categories selected from the group comprising nouns, verbs, and adjectives.

11. A method according to claim 9, further comprising:
arbitrarily selecting one such category if the word is assigned into a plurality of categories.

12. A method according to claim 7, wherein the one component of the selected message that is recoverable from the transformed message is provided using image text that is human-readable, yet not readily machine-readable.

13. A system for sending a transformed message with enhanced privacy, comprising:
a data store to store a plurality of electronic digital messages comprising:
a defined set of input messages;
and a defined set of output messages;
a memory to store a lexicon comprised of a defined family of secret permutations, which are derived from an encryption key k;
a processor to execute module to efficiently transform with the secret permutations of the lexicon one or more words in an input message directly into a transformed message different from the input message and to send the transformed message, comprising:
an encrypter to substitute at least one word of the input message with a word selected from either the input messages set or the output messages set, wherein the cost of identifying the substitution exceeds a defined computational cost threshold;
a key generator to define the encryption key k according to the output of a deterministic function applied to a component of the selected message that is recoverable from the transformed message, wherein the cost of evaluating the deterministic function exceeds a certain computational cost threshold;
a transformation function defined according to an output of a deterministic function parameterized by a choice of the encryption key k; and
a tagger to identify a morphological process for each word and to tag a resulting root form of the word, wherein a substitute root form is selected by applying the transformation function and the morphological process is applied to the substitute root form.

14. A system according to claim 13, wherein the one component of the selected message that is recoverable from the transformed message is provided using image text that is human-readable, yet not readily machine-readable.

15. A method for sending a transformed message with enhanced privacy, wherein all the steps are performed on a suitably programmed computer comprising:
defining a set of input messages;
defining a set of output messages;
defining a lexicon comprised of a family of secret permutations, which are derived from an encryption key k;
efficiently transforming with the secret permutations of the lexicon one or more words in an input message directly into a transformed message different from the input message and sending the transformed message, comprising:
substituting at least one word of the input message with a word selected from either the input messages set or the output messages set, wherein the cost of identifying the substitution exceeds a defined computational cost threshold;
defining the encryption key k according to the output of a deterministic function applied to a component of the input message that is recoverable from the transformed message, wherein the cost of evaluating the deterministic function exceeds a certain computational cost threshold; and
defining a transformation function according to an output of a deterministic function parameterized by a choice of the encryption key k; and
identifying a morphological process for each word and tagging a resulting root form of the word;
and selecting a substitute root form by applying the transformation function and applying the morphological process to the substitute root form.

16. A system for receiving a transformed message with enhanced privacy, comprising:
a data store to store a plurality of electronic digital messages comprising:
a defined set of input messages;
and a defined set of output messages;
a memory to store a lexicon comprised of a defined family of secret permutations, which are derived from an encryption key k;
a processor executing a module to receive a transformed message and to efficiently transform with the secret permutations of the lexicon one or more words in the transformed message directly into an input message different from the transformed message, comprising:
a decryptor to recover at least one word of the transformed message from either the input messages set or the output messages set, wherein the cost of recovering the word exceeds a defined computational cost threshold;
a key generator to define the encryption key k according to the output of a deterministic function applied to a component of the selected message that is recoverable from the transformed message, wherein the cost of evaluating the deterministic function exceeds a certain computational cost threshold;
a transformation function defined according to an output of a deterministic function parameterized by a choice of the encryption key k; and
a tagger to identify a morphological process for each word and to tag a resulting root form of the word, wherein a substitute root form is selected by applying the transformation function and the morphological process is applied to the substitute root form.

17. A system according to claim 16, wherein the one component of the selected message that is recoverable from the transformed message is provided using image text that is human-readable, yet not readily machine-readable.

18. A method for receiving a transformed message with enhanced privacy, wherein all the steps are performed on a suitably programmed computer comprising:
defining a set of input messages;
defining a set of output messages;
defining a lexicon comprised of a family of secret permutations, which are derived from an encryption key k;
receiving a transformed message;
efficiently transforming with the secret permutations of the lexicon one or more words in the transformed message directly into an input message different from the transformed message, comprising:
recovering at least one word of the transformed message from either the input messages set or the output messages set, wherein the cost of recovering the word exceeds a defined computational cost threshold;

defining the encryption key k according to the output of a deterministic function applied to a component of the input message that is recoverable from the transformed message, wherein the cost of evaluating the deterministic function exceeds a certain computational cost threshold;

and defining a transformation function according to an output of a deterministic function parameterized by a choice of the encryption key k; and identifying a morphological process for each word and tagging a resulting root form of the word;

and selecting a substitute root form by applying the transformation function and applying the morphological process to the substitute root form.

19. A system for exchanging a transformed message between a sender and a recipient with enhanced privacy, comprising:

a data store to store a plurality of electronic digital messages comprising:

a defined set of input messages;

and a defined set of output messages;

a memory to store a lexicon comprised of a defined family of secret permutations, which are derived from an encryption key k;

a processor executing an applet to select a message from the input messages set, and to efficiently transform with the secret permutations of the lexicon one or more words in the selected message directly into a transformed message different from the selected message by altering the selected message semantics but preserving structure, comprising:

a key generator to define the encryption key k according to the output of a deterministic function applied to the one component of the selected message that is recoverable from the transformed message, wherein the cost of evaluating the deterministic function exceeds a certain computational cost threshold;

an encrypter to define a transformation function according to an output of a deterministic function parameterized by a choice of the encryption key k, wherein the transformed message belongs to the set of output messages, at least one component of the selected message is recoverable from the transformed message, and the cost of determining whether the transformed message belongs to the input messages set or the output messages set exceeds a defined computational cost threshold; and a tagger to identify a morphological process for each word and to tag a resulting root form of the word, wherein a substitute root form is selected by applying the transformation function and the morphological process is applied to the substitute root form.

20. A method for exchanging a transformed message between a sender and a recipient with enhanced privacy, wherein all the steps are performed on a suitably programmed computer comprising:

defining a set of input messages;

defining a set of output messages;

defining a lexicon comprised of a family of secret permutations, which are derived from an encryption key k;

selecting a message from the input messages set;

efficiently transforming with the secret permutations of the lexicon one or more words in the selected message directly into a transformed message different from the selected message by altering the selected message semantics but preserving structure, comprising:

defining the encryption key k according to the output of a deterministic function applied to the one component of the selected message that is recoverable from the transformed message, wherein the cost of evaluating the deterministic function exceeds a certain computational cost threshold; and defining a transformation function according to an output of a deterministic function parameterized by a choice of the encryption key k, wherein the transformed message belongs to the set of output messages, at least one component of the selected message is recoverable from the transformed message, and the cost of determining whether the transformed message belongs to the input messages set or the output messages set exceeds a defined computational cost threshold; and identifying a morphological process for each word and tagging a resulting root form of the word;

and selecting a substitute root form by applying the transformation function and applying the morphological process to the substitute root form.

* * * * *